March 5, 1968  F. REIFENHÄUSER  3,371,379
APPARATUS FOR DEGASSING THERMOPLASTIC
MATERIAL IN SCREW PRESSES
Filed Jan. 24, 1966
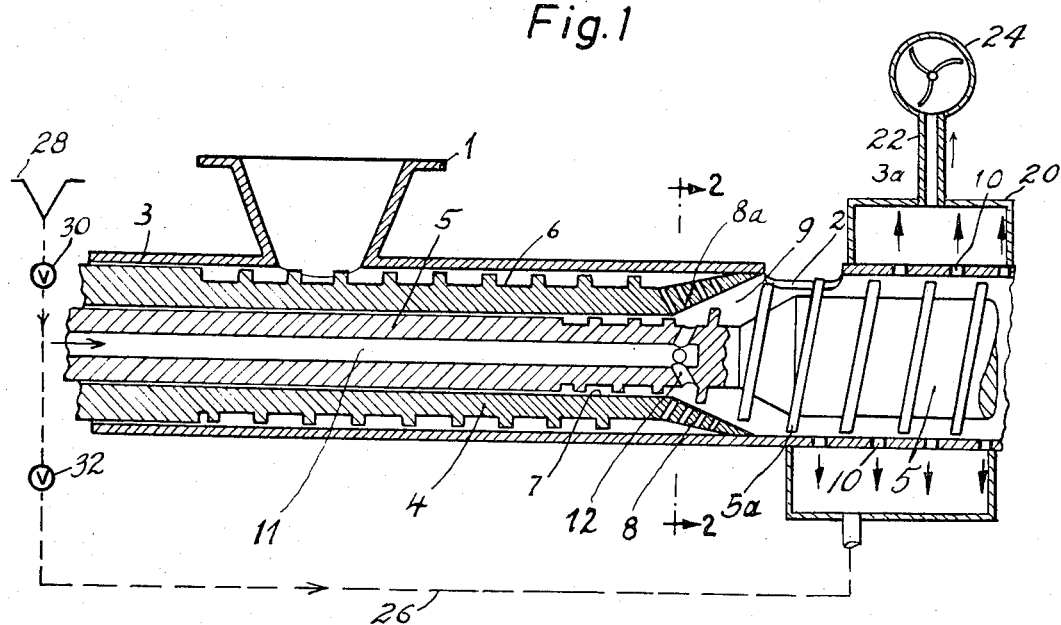
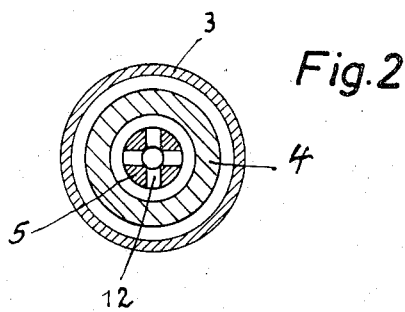
INVENTOR.
Friedrich Reifenhäuser
BY
Meyer, Tilberry & Body United States Patent Office 3,371,379
Patented Mar. 5, 1968

3,371,379
APPARATUS FOR DEGASSING THERMOPLASTIC MATERIAL IN SCREW PRESSES
Friedrich Reifenhäuser, Troisdorf, Germany, assignor to Reifenhauser K.G., Troisdorf, Germany
Filed Jan. 24, 1966, Ser. No. 522,746
4 Claims. (Cl. 18—12)

ABSTRACT OF THE DISCLOSURE

The disclosure relates to the provision of structure for removing gas in addition to that which is liberated in the expansion zone of a rotating screw plastic extruder which comprises an elongated extension of the main discharge casing and which has a plurality of longitudinally and circumferentially spaced holes. The holes communicate with a vacuum manifold for positively removing any liberated gases. Additional degassing means is provided by a central channel in the take-up screw which has its suction end at the expansion zone and its discharge end connected to the vacuum manifold.

---

The present invention relates to screw presses for mechanically working and conveying thermoplastic material.

More particularly the invention relates to an improved means for eliminating pockets of air and other gaseous impurities which may be present in thermoplastic materials being forced through a screw press of the type shown in my prior U.S. Patent No. 3,035,304.

The screw press of U.S. Patent No. 3,035,304 includes a hollow feed screw and a take-up screw coaxially mounted end-to-end in a cylindrical casing. A hamper is provided in the casing for supplying thermoplastic material to the feed screw. The hollow feed screw defines a central cylindrical bore which rotatably receives a shank portion of the take-up screw so that the screws may be driven at different rates of speed. Located at the outflow end of the feed screw is a restriction formed by a conical flange which extends forwardly and outwardly to the wall of the casing. Openings in the flange permit material to flow through the flange and into an expansion space defined by the wall of the casing, the inward end of the take-up screw and the inner wall of the conical flange.

While the feed screw and take-up screw have the same thread diameter, the take-up screw is adapted to turn at a faster rate and thus causes a vacuum in the expansion space between the drive zones of the two screws. The portion of the casing which helps define the expansion space is provided with an aperture which communicates with a vacuum means which creates a suction for removing gas which is liberated from the material due to the reduction in pressure. Since pockets of air and other gaseous impurities are highly compressed in the plastic material by the feed screw before reaching the expansion space, they increase in size greatly when the pressure is relieved and a large portion of the trapped gases may be liberated when a means for escape is provided. However, since the take-up screw normally turns at a greater speed than the feed screw, the material moves quite rapidly after entering the expansion space and in many cases there is insufficient time for trapped gases to escape through the aperture. Also due to the strong suction which must be provided at the aperture to achieve adequate degassing, there is a tendency for some of the plastic material to be sucked out of the expansion space.

The construction of the present invention meets the above objections and provides improved degassing of the material without requiring extensive alteration and modification of existing equipment.

According to the invention, the portion of the cylindrical casing adjacent the working zone of the take-up screw is provided with small openings which are evenly distributed along the cylindrical portion defined by the travel of the take-up screw threads. Means is provided for creating a vacuum at these openings so that the resulting suction causes the removal of trapped gases.

As another aspect of the invention, the shank of the take-up screw, which is mounted in the circular bore in the feed screw, is provided with an enclosed axial channel which communicates with the expansion space by means of radial passages formed in the bore of the shank thus permitting gas to be liberated from the expansion space through the channel. A vacuum is also created in the channel so that the resulting suction facilitates the removal of trapped gases from the material in the expansion space.

As a further aspect of the invention, the channel in the shank may be used to introduce a supplementary component to the thermoplastic material in the expansion space, such as, for example, a plastic foam. This enables the press to emit a thermoplastic foam mixture which might be desirable for certain applications.

The use of the supplementary openings in the portion of the casing adjacent the thread travel of the take-up screw permits a relatively weak vacuum to be utilized for the removal of trapped gases. This prevents the escape of plastic material through the openings. Where only one large aperture is provided in the vicinity of the expansion space, the vacuum, in order to be equally effective, would have to be quite strong and the escape of some material would be unavoidable.

It is among the objects of the invention to provide a new and improved screw press for thermoplastic materials providing a more complete liberation of gases trapped in the material which may be achieved without extensive alteration and modification of existing equipment.

Other objects, uses and advantages of the invention will become apparent from the following detailed description and drawings which disclose a specific embodiment of the invention and are not for the purpose of limitation and wherein:

FIGURE 1 is a longitudinal cross-sectional view of a screw press embodying the invention; and FIGURE 2 is a transverse cross-sectional view taken on the line 2—2 of FIGURE 1.

Referring more particularly to the drawings there is shown a screw press for mechanically working and conveying thermoplastic material. The apparatus includes a hopper 1 adapted to receive plastic material to be introduced into the press. The hopper 1 is mounted on a cylindrical casing 3 having a hollow feed screw 4 and a take-up screw 5 rotatably mounted therein.

The feed screw 4 has helical threads which have an outer diameter substantially equal to the inner diameter of the cylindrical casing 3. The threads are adapted to convey material introduced from the hopper 1, axially through the casing.

The take-up screw 5 is also provided with helical threads 5a having an outer diameter substantially equal to the inner diameter of the cylindrical casing 3 and adapted to convey material axially through the press in the same direction. Located at the inner end of the take-up screw 5 is a shank 6 rotatably mounted in a circular bore 7 formed in the feed screw 3.

Located at the output end of the feed screw 4 is a conical flange 8 which extends outwardly to the wall of the casing 3 as best shown in FIGURE 1. This provides a restriction at the output end of the feed screw so that material located adjacent thereto is under a high pressure.

Adjacent the conical flange 8 is an expansion space 9 formed by the inner surface of the conical flange 8, the surrounding wall of the casing 2 and the inward end of the take-up screw 5. Material carried by the feed screw 4 is conveyed to the expansion space 9 by means of small openings 8a formed in the flange 8. Located in the portion of the casing 3 adjacent the expansion space 9 is an aperture 2 to provide for the escape of trapped air and other gases from the material as it passes through the expansion space 9. Normally a vacuum is provided at the opening 2 so that the resulting suction serves to draw off gases which are liberated as material enters the expansion space 9.

In accordance with the invention, the portion 3a of the casing which surrounds the path of travel of the helical threads 5a of the take-up screw 5 is provided with small openings 10 which are uniformly spaced along the casing portion 3a. A vacuum is provided at the openings 10 which serves to create a suction to draw off additional trapped gases in the material being conveyed by the screw threads 5a. The vacuum provided may be relatively weak at the openings 10 since due to the multiplicity thereof and the spacing, very little suction is necessary to achieve the desired results. The holes 10 are of a sufficient size that thermoplastic material being conveyed will not escape therefrom in view of the low magnitude of the suction provided. The vacuum to openings 10 is provided by a vacuum manifold 20 mounted on casing 3 with the manifold being connected by a line 22 to a conventional vacuum means such as a vacuum pump 24.

Also in accordance with one aspect of the invention the shank 6 of the output screw 5 is provided with an enclosed channel 11 which extends through the shank to the portion adjacent the expansion space 9. The channel 11 communicates with the expansion space 9 by means of small radial passages 12 extending through the shank to the channel 11.

Normally a vacuum is provided in the channel 11 by a vacuum line 26 connected to manifold 20 through a shutoff valve 32 to cause a suction tending to draw out trapped air and gases from the material which are liberated in the expansion space 9.

In accordance with an additional feature of the invention, the channel 11 may be disconnected from the vacuum source 20 by securing valve 32 and used to introduce a supplementary material to the thermoplastic material being conveyed as it passes through the expansion space 9 by opening valve 30 and adding the supplementary material through hopper 28. For example, a plastic foam material may be introduced through the channel 11 into the expansion space 9 so that the composition emitted by the screw press is a thermoplastic foam mixture.

It is to be understood that in accordance with the provisions of the patent statutes variations and modifications of the specific devices herein shown and described may be made without departing from the spirit of the invention.

Having thus described my invention, I claim:

1. In a screw press for mechanically working and conveying plastic materials including a casing, a feed screw and a take-up screw coaxially aligned end-to-end in said casing, a restriction at the output end of said feed screw including a conical flange on said feed screw, means defining an expansion space communicating through said restriction and located at the input end of said take-up screw a first relatively large aperture in the casing in the area of said expansion space, a material propelling thread of the take-up screw starting in said expansion space, said screws being adapted to be driven at relatively different rotational rates and the second screw to advance the material faster than the first screw, whereby, in the expansion space, there occurs a reduction in pressure operating to liberate gas in the material; the improvement comprising: degassing means for removing gas from the plastic material including: said casing extending in a longitudinal direction along the axis of said take-up screw for a substantial distance from the input end of the said take-up screw, a plurality of spaced relatively small openings spaced longitudinally and circumferentially along said casing for said substantial distance, vacuum means for creating a suction at said openings, said openings being individually of such a size as to permit escape of liberated gas but prevent the escape of the plastic material therethrough.

2. A screw press as defined in claim 1 wherein said feed screw has a central bore and said take-up screw has a shank at the inner end thereof rotatably mounted in said bore and extending axially therethrough, said shank having an enclosed channel formed therein which communicates through radial passages with said expansion space on one end thereof and which channel communicates with a vacuum means thereby allowing for the removal of the liberated gas from said expansion zone.

3. A screw press as defined in claim 2 wherein means is provided for introducing a supplementary component material into said expansion space through said channel.

4. A screw press as defined in claim 2 wherein said supplementary component material is a foam plastic.

References Cited

UNITED STATES PATENTS

| | | | |
|---|---|---|---|
| 2,774,105 | 12/1956 | Bernhardt | 18—12 |
| 3,121,914 | 2/1964 | Olson et al. | 18—12 |
| 3,150,214 | 9/1964 | Scalora et al. | 18—12 |
| 1,478,842 | 12/1923 | Staley. | |
| 2,434,707 | 1/1948 | Marshall. | |
| 3,023,456 | 3/1962 | Palfey | 18—12 |
| 3,035,304 | 5/1962 | Reifenhauser et al. | 18—12 |
| 3,040,005 | 6/1962 | Bernhardt et al. | 18—12 |
| 3,154,007 | 10/1964 | Schaub et al. | 18—12 |

FOREIGN PATENTS

| | | |
|---|---|---|
| 253,743 | 8/1964 | Australia. |

WILLIAM J. STEPHENSON, *Primary Examiner.*